(12) United States Patent
Shirakura et al.

(10) Patent No.: US 8,379,281 B2
(45) Date of Patent: Feb. 19, 2013

(54) HOLOGRAM JUDGING APPARATUS

(75) Inventors: Akira Shirakura, Tokyo (JP); Koji Ashikazi, Tokyo (JP)

(73) Assignee: Sony Corporation, Tokyo (JP)

(*) Notice: Subject to any disclaimer, the term of this patent is extended or adjusted under 35 U.S.C. 154(b) by 254 days.

(21) Appl. No.: 12/765,558

(22) Filed: Apr. 22, 2010

(65) Prior Publication Data

US 2010/0290098 A1 Nov. 18, 2010

(30) Foreign Application Priority Data

May 14, 2009 (JP) .................. 2009-117450

(51) Int. Cl.
*G03H 1/00* (2006.01)

(52) U.S. Cl. ........................................... 359/2

(58) Field of Classification Search .................. 359/1–35
See application file for complete search history.

(56) References Cited

U.S. PATENT DOCUMENTS

| | | | |
|---|---|---|---|
| 5,486,933 A | 1/1996 | Shindo | |
| 2002/0131597 A1 | 9/2002 | Hori | |
| 2005/0058910 A1* | 3/2005 | Takizawa et al. | 430/1 |
| 2007/0121186 A1 | 5/2007 | Kitamura | |

FOREIGN PATENT DOCUMENTS

| | | |
|---|---|---|
| JP | 63-198075 | 12/1988 |
| JP | 01-096682 | 4/1989 |
| JP | 04-340583 | 11/1992 |
| JP | 05-323851 | 7/1993 |
| JP | 06-110378 | 4/1994 |
| JP | 06-282216 | 10/1994 |
| JP | 2001-307171 | 11/2001 |
| JP | 2002-333817 | 11/2002 |
| JP | 2006-076248 | 3/2006 |
| JP | 2007-147850 | 6/2007 |
| JP | 2008-145991 | 6/2008 |
| WO | 2009/056357 | 5/2009 |

OTHER PUBLICATIONS

Japanese Office Action issued on Sep. 4, 2012, in connection with counterpart JP Application No. 2009-117450.

* cited by examiner

*Primary Examiner* — Jennifer L. Doak
(74) *Attorney, Agent, or Firm* — SNR Denton US LLP

(57) ABSTRACT

A hologram judging apparatus includes a housing and first and second light sources attached to the housing and emitting reconstruction illumination light. In the hologram judging apparatus, the first and second light sources each include a wavelength component with a wavelength $\lambda$ meeting the reconstruction condition of a Lippmann hologram, and any one of the first and second light sources is a light source making the reconstruction illumination light enter a hologram at an angle $\theta\mathrm{ref}$ which is identical to another angle $\theta\mathrm{ref}$ with respect to the normal in a plane of incidence, the other angle $\theta\mathrm{ref}$ meeting the reconstruction condition of a Lippmann method.

8 Claims, 18 Drawing Sheets

FIG. 10

| RECONSTRUCTION LIGHT WAVELENGTH | HOLOGRAM METHOD | |
|---|---|---|
| | LIPPMANN | EMBOSSED |
| RED LED | INVISIBLE | VISIBLE |
| GREEN LED | APPEARS BRIGHT | VISIBLE |
| BLUE LED | APPEARS DARK | VISIBLE |

FIG. 11

| RECONSTRUCTION LIGHT WAVELENGTH AND LED USED | HOLOGRAM METHOD | |
|---|---|---|
| | LIPPMANN | EMBOSSED |
| LED31G | VISIBLE | VISIBLE |
| LED31R | INVISIBLE | VISIBLE |
| LED32G | INVISIBLE | VISIBLE |
| LED32R | INVISIBLE | VISIBLE |

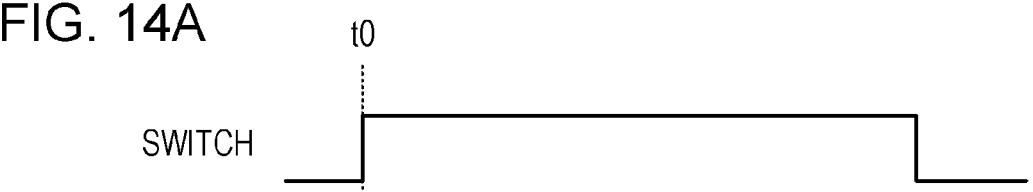
FIG. 14A
FIG. 14B
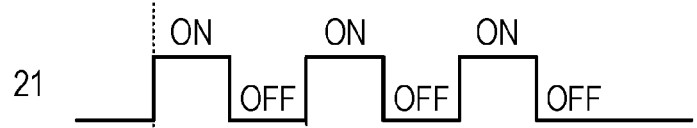
FIG. 14C
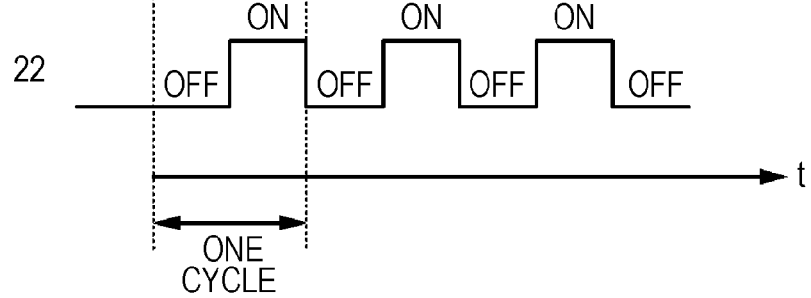
FIG. 14D

HOLOGRAM JUDGING APPARATUS

BACKGROUND OF THE INVENTION

1. Field of the Invention

The present invention relates to an apparatus for judging whether a Lippmann hologram which records the interference fringes of signal light (object light) and reference light is genuine or not.

2. Description of the Related Art

Holograms are often used in the so-called security field in which the authenticity of an article, that is, a judgment as to whether the article is genuine or not, is desired because the holograms, which are three-dimensional visual images, are difficult to produce, and are difficult to replicate. For example, the holograms are used to prevent counterfeiting of credit cards, ID cards, and cash vouchers such as gift vouchers. At present, surface relief-type rainbow holograms and embossed holograms using relief patterns on a reflecting surface (a front surface), the embossed holograms produced by the microfabrication technique adopting electron beam drawing, are often used. The embossed holograms are sometimes called relief holograms.

As the embossed holograms are thus widely used and become widespread, embossed hologram production equipment also becomes widely available, which sometimes results in the mass production of counterfeits. Since the principles of the embossing method use the relief patterns on the reflecting surface, a technique of exposing the relief pattern surface by ingeniously taking apart a hologram and transferring the relief patterns is also used as a method of counterfeiting.

As can be expected from the fact that there is the above-mentioned technique of transferring the relief patterns, the embossed holograms have the problem of being easily counterfeited. By contrast, it is extremely difficult to counterfeit Lippmann holograms which record the interference fringes as the difference in index of refraction inside a recording material. The reason is that advanced techniques are necessary to produce an image and recording materials are difficult to obtain. As a method of producing the Lippmann holograms, there are a photographed hologram illuminating a subject with a laser and a holographic stereogram recording on the basis of a multiple-view parallax image.

The process of producing the Lippmann holographic stereogram is schematically made up of the content creation process including the acquisition of an image and processing such as editing of the acquired image, the hologram original plate production process, and the replication (mass-production) process. The image is acquired by imaging or computer graphics. Each of a plurality of images obtained in the image editing process is converted into a strip parallax image by a cylindrical lens, for example. The interference fringes of the object light of the image and the reference light are sequentially recorded on a hologram recording medium as strip element holograms, whereby an original plate is produced. The hologram recording medium is brought into intimate contact with the original plate, and is illuminated with a laser beam, whereby a hologram is replicated.

In this hologram, image information obtained by sequentially taking the image from different observation points in the lateral direction, for example, is sequentially recorded in the lateral direction as strip element holograms. When the observer views this hologram with both eyes, two-dimensional images in the right and left eyes are slightly different, causing a parallax in the eyes of the observer and thereby reconstructing a three-dimensional image.

As described above, when the strip element holograms are sequentially recorded, an HPO (horizontal parallax only) holographic stereogram having a parallax in only a horizontal direction is produced. With the HPO holographic stereogram, printing takes a shorter time, making it possible to realize recording with high image quality. Furthermore, it is also possible to create a vertical parallax in the recording method. The holograms having a parallax in both horizontal and perpendicular directions are referred to as FP (full parallax) holograms. Incidentally, in the FP holograms, each of a plurality of images obtained in the image editing process is converted into a rectangular parallax image by a spherical lens, for example. The interference fringes of the object light of the image and the reference light are sequentially recorded on a hologram recording medium as rectangular element holograms, whereby an original plate is produced.

Compared to the embossed holograms, the Lippmann holograms are difficult to counterfeit because the hologram information is recorded as the difference in index of refraction inside the recording material, and are suitable for a judgment as to whether an article such as a credit card or an ID card is genuine or not. Actually, counterfeiting of the embossed holograms has occurred. In the future, the Lippmann holograms are expected to be used for security purposes.

However, as in the case of counterfeiting of the embossed holograms, counterfeiters are trying various methods to counterfeit the Lippmann holograms as sophisticatedly as possible and at low cost. These methods include a method of creating an embossed hologram having the same design (image content) as a Lippmann hologram. Although a person who has knowledge of holograms can often find successfully that the embossed hologram created by this method is a counterfeit, there is a possibility that a person who does not have knowledge of holograms is not able to judge whether it is a counterfeit or not.

In the past, an apparatus illuminating a hologram at a predetermined angle for visual observation of the quality of the hologram and an apparatus detecting light with a light receiving element, the light reconstructed as a result of a hologram being illuminated at a predetermined angle, to judge whether the hologram is genuine or not have been proposed.

For example, Japanese Unexamined Utility Model Publication No. 63-198075 describes an apparatus which allows a hologram to be observed under an optimum condition by setting an optimum angle which incoming light forms with the hologram.

Japanese Unexamined Patent Application Publication No. 62-093754 describes that information for determination of authenticity is recorded on a card in advance as a hologram so as to be read differently according to the angle of the reference light, and the authenticity is determined by reading this information by the reference light at a predetermined angle.

Japanese Unexamined Patent Application Publication No. 2001-307171 describes an apparatus for judging whether a hologram is genuine or not, the apparatus provided with an incident direction changing unit changing the incident direction of measurement light for a hologram.

Japanese Unexamined Patent Application Publication No. 2007-147850 describes a hologram reader in which a point light source array of light is disposed, the hologram reader which can selectively turn on any point light source of the point light source array.

Japanese Unexamined Patent Application Publication No. 2002-333817 describes an apparatus for judging whether a hologram is genuine or not, the apparatus provided with a light source emitting light of a wavelength which meets the reconstruction condition of the hologram and a light source emitting light of a different wavelength and illuminating the entire hologram.

SUMMARY OF THE INVENTION

Japanese Unexamined Utility Model Publication No. 63-198075 and Japanese Unexamined Patent Application Publications Nos. 62-093754, 2001-307171, 2007-147850, 2002-333817 described above do not disclose a technique or apparatus for distinguishing between a Lippmann hologram and an embossed hologram. The technique and apparatuses described in these documents are mainly used for a judgment as to whether an embossed hologram is genuine or not, and are not satisfactorily effective in judging that an embossed hologram produced to resemble a Lippmann hologram is a counterfeit.

It is desirable to provide a hologram judging apparatus which can judge that an embossed hologram which records the same design as a Lippmann hologram as a counterfeit hologram with a high degree of precision and with ease.

According to an embodiment of the present invention, there is provided a hologram judging apparatus including a housing and first and second light sources attached to the housing and emitting reconstruction illumination light. The first and second light sources each includes a wavelength component with a wavelength $\lambda$ meeting the reconstruction condition of a Lippmann hologram, and any one of the first and second light sources is a light source making the reconstruction illumination light enter a hologram at an angle $\theta ref$ which is identical to another angle $\theta ref$ with respect to the normal in a plane of incidence, the other angle $\theta ref$ meeting the reconstruction condition of a Lippmann method.

According to another embodiment of the present invention, there is provided a hologram judging apparatus including a housing and first and second light sources attached to the housing and emitting reconstruction illumination light. One of the first and second light sources includes a wavelength component with a wavelength $\lambda$ meeting the reconstruction condition of a Lippmann hologram.

According to the embodiments of the present invention, by switching between reconstruction light wavelengths and switching between incident directions, it is possible to distinguish between a Lippmann hologram and an embossed hologram easily. The use of the judging apparatus according to the embodiments of the present invention allows the user to distinguish between a Lippmann hologram and an embossed hologram with ease and a high degree of precision. Hologram makers produce judging apparatuses according to the reconstruction conditions (the wavelength and the angle of incidence) of holograms they produce, and offer the apparatuses to the users, thereby enhancing security of the holograms they produce. As the users of the holograms, product makers that desire to prevent counterfeiting of their products attach a Lippmann hologram to their products and introduce a judging apparatus, whereby they can distinguish counterfeits from genuine products, and ask the governmental agencies such as the customs to crack down the counterfeits. The consumer users who purchase the products can easily distinguish counterfeits from genuine products.

Also, as described in "Japan Patent Office Annual Report 2008" issued by Japan Patent Office (pp. 181 to 183, "Column: Studies and Research on New Types of Trademark"), some foreign countries outside of Japan recently institutionalize hologram trademarks. Therefore, a hologram such as a Lippmann hologram which is difficult to counterfeit and is easy to be distinguished from a counterfeit can increase the value of a product from the standpoint of intellectual property (trademark).

BRIEF DESCRIPTION OF THE DRAWINGS

FIG. 10 illustrates the relationship between the hologram method and the wavelength of reconstruction illumination light;

FIG. 11 illustrates the relationship between the hologram method according to the other embodiment of the present invention and the wavelength of reconstruction illumination light;

FIGS. 14A to 14D are timing charts of the first example of the light source driving method according to an embodiment of the present invention;

DESCRIPTION OF THE PREFERRED EMBODIMENTS

A preferred embodiment (referred to below as an embodiment) of the present invention will be described in the following order:
1. Embodiment
2. Another Embodiment
3. Light Source Driving Method
4. Modified Example It is to be understood that embodiments of the present invention described below are preferred specific examples of the present invention and include various preferred technical limitations. However, the scope of the present invention is not limited to these embodiments unless stated that it is limited thereto in the following description.

An outline of the embodiments of the present invention will be described. In a Lippmann hologram, the positional relationship (angular relationship) between reconstruction light which should enter at the time of reconstruction and a hologram material is determined by the positional relationship (angular relationship) between the traveling direction of light (object light) of an image at the time of recording, the traveling direction of reference light at the time of recording, and a hologram recording material. A state of change in the index of refraction inside the hologram recording material is determined by the above positional relationship and the wavelength of a recording laser. Also in an embossed hologram, the positional relationship (angular relationship) between reconstruction light which should enter at the time of reconstruction and a hologram material is determined by the principles of holography. However, since the light interference condition is determined by the relief pattern shape of a reflecting surface, the image is sometimes reconstructed even when the wavelength of light and the positional relationship (angular relationship) at the time of reconstruction are different from those at the time of recording. The name rainbow hologram is derived from the fact that the image can be reconstructed even when the wavelength of light is different.

Thus, in an embodiment of the present invention, a Lippmann hologram is distinguished from an embossed hologram by using the positional relationship (angular relationship) between reconstruction illumination light which should enter at the time of reconstruction and a hologram material. Furthermore, in another embodiment of the present invention, a Lippmann hologram is distinguished from an embossed hologram by using the wavelength of reconstruction illumination light which should enter at the time of reconstruction.

1. Embodiment
Regarding a Lippmann Hologram and an Embossed Hologram

Figure 1A:
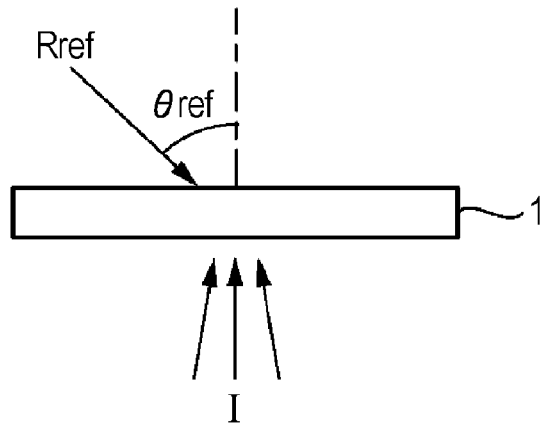
FIGS. 1A to 1C are schematic diagrams used for describing recording and reconstruction of a Lippmann hologram to which an embodiment of the present invention is applicable.
Figure 1B:
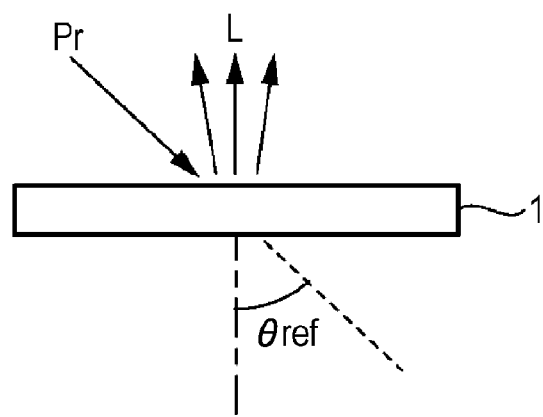
Figure 1C:
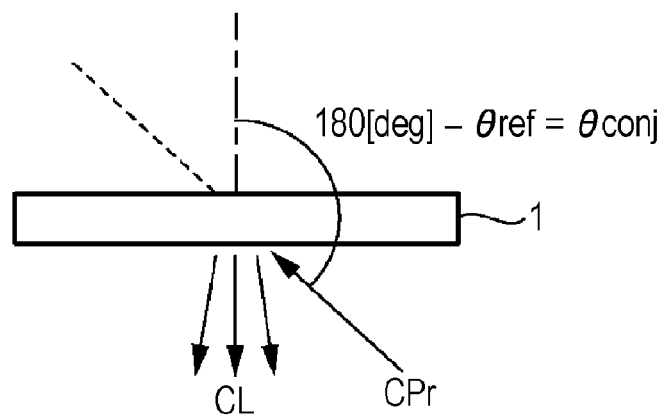

An embodiment distinguishes between a Lippmann hologram and an embossed hologram by using the positional relationship (angular relationship) between reconstruction light which should enter at the time of reconstruction and a hologram material. FIGS. 1A to 1C illustrate a Lippmann hologram in a general way.

When a hologram is produced, as shown in FIG. 1A, one laser beam (referred to below as recording reference light) Rref obtained by splitting a laser beam by a beam splitter enters a hologram (which is a hologram recording medium before recording is performed; however, a hologram recording medium is also referred to as a hologram) 1 at an angle of incidence θref. The other laser beam obtained by splitting is shone on an object, and light I reflected from the object (referred to below as object light) is shone on the hologram 1. The recording reference light Rref and the object light I interfere with each other, and interference fringes are recorded on the hologram 1.

The hologram 1 is a photosensitive recording material such as a photopolymer material using silver salt, dichromated gelatin, and an organic compound. In the Lippmann hologram, light interference fringes are recorded as the difference in index of refraction inside the recording material.

In the Lippmann hologram on which recording has been performed as described above, reconstruction light L is diffracted by illuminating the hologram 1 with the same light (referred to below as reconstruction illumination light) Pr as the recording reference light at the time of reconstruction as shown in FIG. 1B, or reconstruction light CL is diffracted by illuminating the hologram 1 with conjugated reconstruction illumination light CPr as shown in FIG. 1C.

As described above, the Lippmann hologram on which recording has been performed under the recording condition shown in FIG. 1A is reconstructed under the reconstruction condition shown in FIG. 1B or the conjugated reconstruction condition shown in FIG. 1C. In other words, the Lippmann hologram is reconstructed only by the reconstruction illumination light incident from a specific direction. That is, of the diffraction theory of a "thick hologram", only the Lippmann method of the reflection type can reflect the reconstruction light to the same side as the illumination light.

The principles of an embossed hologram will be described with reference to FIGS. 2A to 2C. The theory of diffraction occurring in a "thin hologram" can provide a principled explanation of the recording condition and the reconstruction condition of the embossed hologram. A hologram amenable to the diffraction theory of a "thin hologram" is a transmission hologram, and does not have the function of reflecting light by diffraction.

Figure 2A:
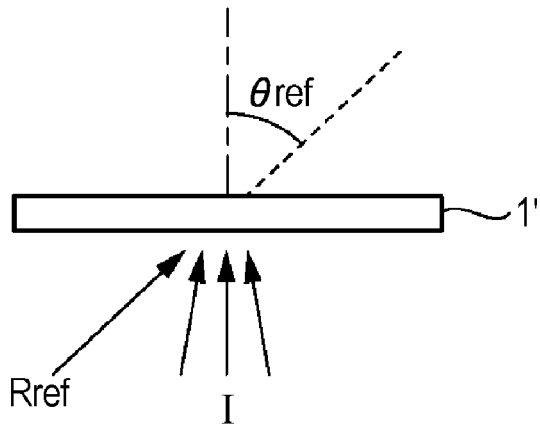
FIGS. 2A to 2C are schematic diagrams used for describing recording and reconstruction of a transmission hologram.

When a hologram is produced, as shown in FIG. 2A, recording reference light Rref enters a transmission hologram 1'. Object light I is shone on the hologram 1'. The recording reference light Rref and the object light I interfere with each other, and interference fringes are recorded on the transmission hologram 1'.

Figure 2B:
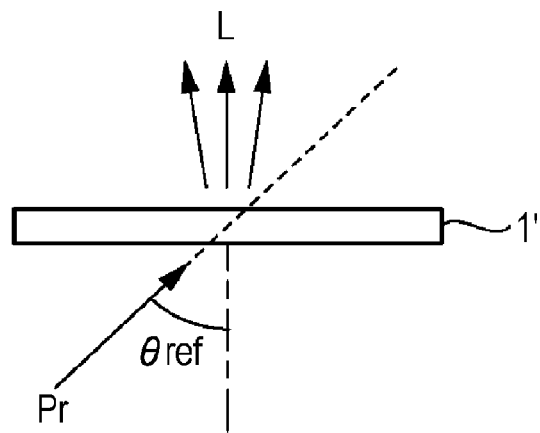
Figure 2C:
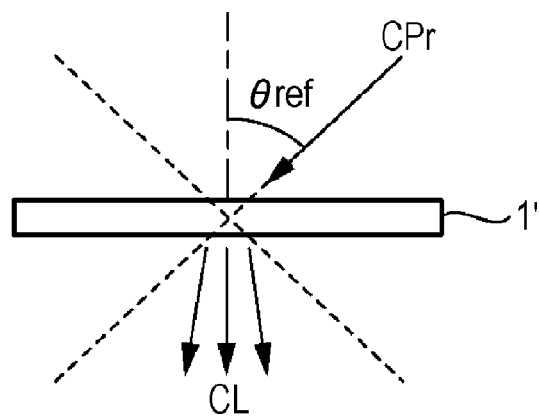

As described above, the transmission hologram 1' on which recording has been performed under the recording condition shown in FIG. 2A is reconstructed under the reconstruction condition shown in FIG. 2B or the conjugated reconstruction condition shown in FIG. 2C.

Figure 3A:
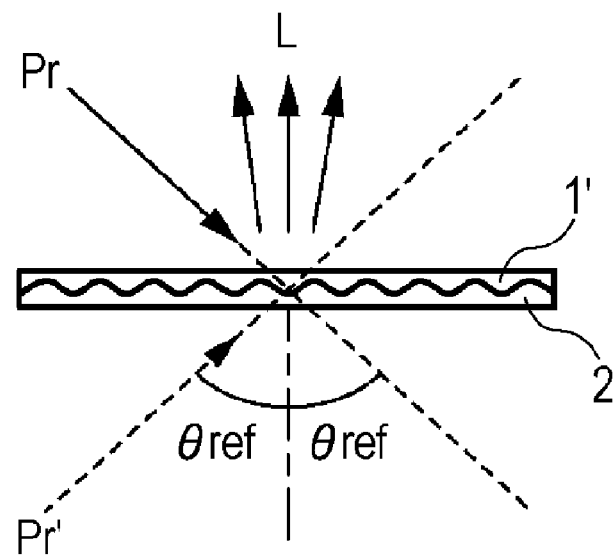
FIGS. 3A and 3B are schematic diagrams used for describing recording and reconstruction of an embossed hologram.
Figure 3B:
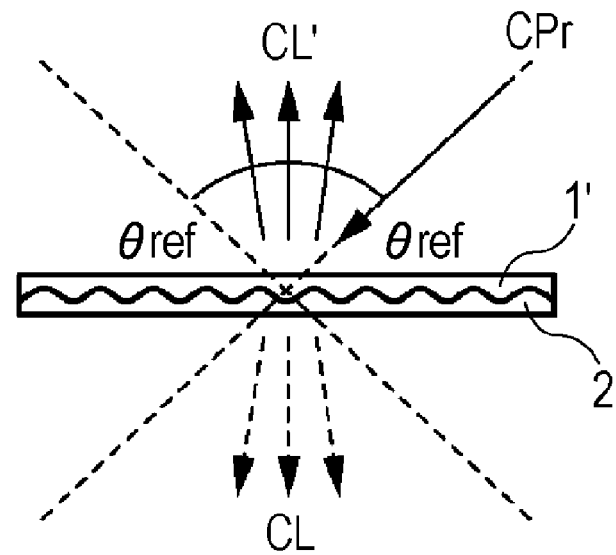

As shown in FIGS. 3A and 3B, as is the case with the rainbow hologram or the like, the embossed hologram becomes a reflection-type hologram as a result of the embossed hologram being provided with a reflection layer 2. The reflection layer 2 is provided on a surface on which a relief pattern is formed, or on an interlayer or opposite layer of the recording material.

In the hologram provided with the reflection layer 2, the image is sometimes reconstructed even under a condition which is different from the reconstruction condition of the transmission hologram 1'. For example, as shown in FIG. 3A, the image is reconstructed (reconstruction light L) not only by the reconstruction illumination light Pr but also by the reconstruction illumination light Pr' in mirror image relation. The reconstruction illumination light Pr' corresponds to the reconstruction illumination light as a transmission hologram amenable to the diffraction theory of a "thin hologram". In addition, as shown in FIG. 3B, the image is reconstructed (conjugated reconstruction light CL' due to the mirror image relation) by the reconstruction illumination light in mirror image relation, and the image is reconstructed (conjugated reconstruction light CL) by the conjugated reconstruction illumination light CPr. As described above, in the embossed hologram provided with the reflection layer, there is a condition under which not only the image is reconstructed only by the reconstruction illumination light in a specific direction as in the reflection-type Lippmann method, but also the images are reconstructed by the reconstruction illumination light in two or more directions. That is, when the Lippmann hologram is compared with the embossed hologram provided with the reflection layer, even the holograms reflecting the reconstruction light in the same direction as the reconstruction illumination light have different characteristics based on the diffraction theory of a hologram.

How to Distinguish a Lippmann Hologram from an Embossed Hologram

Figure 4A:
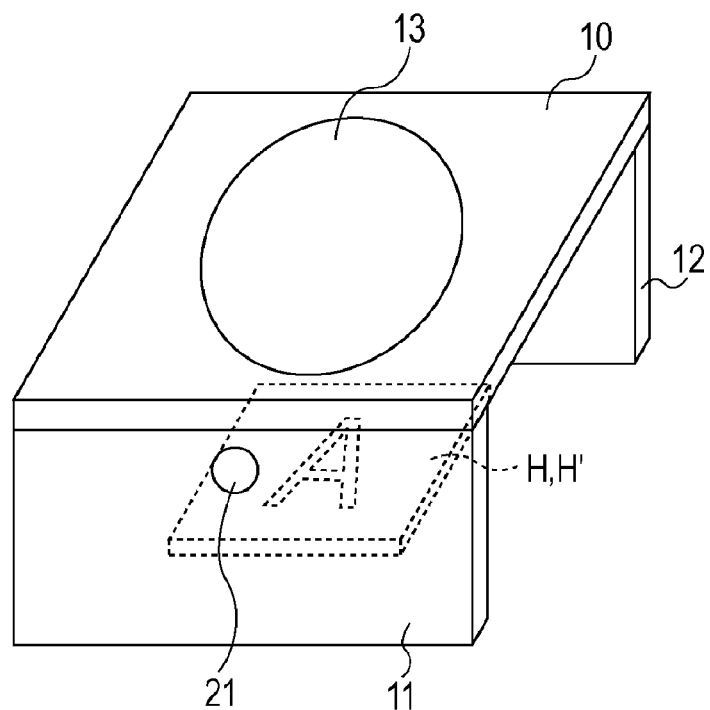
FIGS. 4A and 4B are a perspective view and a sectional view, respectively, of a judging apparatus according to an embodiment of the present invention.
Figure 4B:
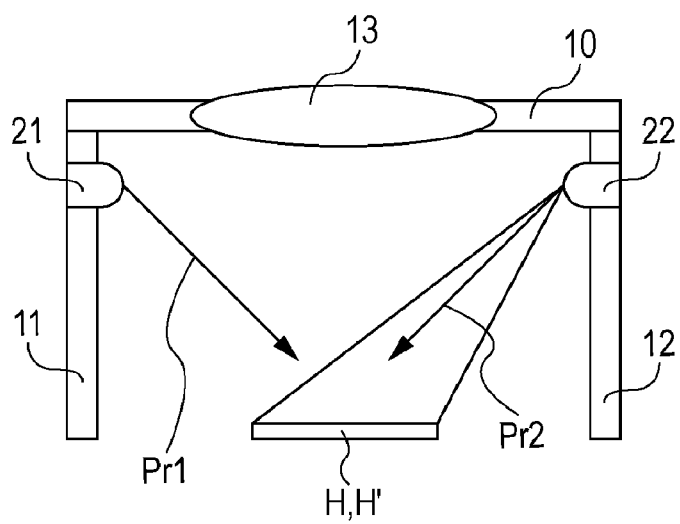

According to an embodiment of present invention, an embossed hologram produced to resemble a Lippmann hologram is judged to be a counterfeit. As shown in FIGS. 4A and 4B, a judging apparatus according to the embodiment of the present invention has a housing made up of a rectangular top surface plate 10 and side surface plates 11 and 12 extending downward perpendicularly from the both sides of the top surface plate 10 and having the same shape. The housing has a structure surrounding a hologram in such a way as to block or reduce outside light, so that the reconstruction illumination light from a light source, not the outside light such as ambient light, is shone on the hologram. Three or more side surface plates may be provided. The top surface plate 10 and the side surface plates 11 and 12 are made of a material such as nontransparent synthetic resin or metal.

In this way, the housing made up of the top surface plate 10 and the side surface plates 11 and 12 reduces the unnecessary light to be shone on a hologram on which a judgment is to be made. In particular, the embodiment of the present invention has a technical feature in that a judgment is made as to whether "the image is reconstructed (the reconstruction condition is met)" or "the image is not reconstructed (the reconstruction condition is not met)" by the reconstruction illumination light entering from a specific direction as described above. Therefore, if a reconstruction image which is not supposed to be seen is reconstructed as a result of the hologram being illuminated with light other than the light from the light source (light sources 21 and 22), a judgment as to whether the hologram is genuine or not may be erroneously made. It is for this reason that the housing blocks or reduces the outside light such as ambient light so that only the light from the light source is used for a judgment as to whether the hologram is genuine or not.

A hologram on which a judgment is to be made is put on the bottom of the space formed by the top surface plate 10 and the side surface plates 11 and 12. A genuine Lippmann hologram is represented as a hologram H, and a counterfeit in the form of an embossed hologram is represented as a hologram H'. The letter "A" is shown in the drawing as an example of a reconstructed image of a hologram. A magnifying lens 13 such as a convex lens is attached to the top surface plate 10, and a first light source 21 and a second light source 22 are attached to the opposed faces of the side surface plates 11 and 12, respectively. The light sources 21 and 22 are attached in the same positions of the side surface plates 11 and 12, respectively, and are driven by an unillustrated light source drive circuit. The light from the light sources 21 and 22 is shone on the hologram H/H' as reconstruction illumination light Pr1 and reconstruction illumination light Pr2.

The reconstruction illumination light Pr1 and the reconstruction illumination light Pr2 each include a wavelength component which is nearly equal to the wavelength λ of the recording reference light of a genuine Lippmann hologram. For example, the wavelength of the recording reference light is assumed to be green, and the wavelengths of the reconstruction illumination light Pr1 and the reconstruction illumination light Pr2 are likewise assumed to be green. The light sources 21 and 22 are made up of one or more LEDs (light emitting diodes) emitting green light, for example. A light-emitting element of the light source is not limited to an LED, and a light source, such as a laser, other than an LED may be used as the light sources 21 and 22. Furthermore, the reconstruction illumination light Pr1 and the reconstruction illumination light Pr2 enter the hologram at angles of incidence θref which are identical with respect to the normal in a plane of incidence. That is, the incident directions of the reconstruction illumination light Pr1 and the reconstruction illumination light Pr2 form θref and −θref, respectively, with respect to the normal direction of the hologram. Incidentally, θref is the angle of incidence of the reconstruction reference light of a genuine Lippmann hologram and, in this embodiment, is equal to the angle of incidence of the recording reference light. The light sources 21 and 22 are alternately lit in such a way that only one of the light sources 21 and 22 is lit at a time.

Figure 5A:
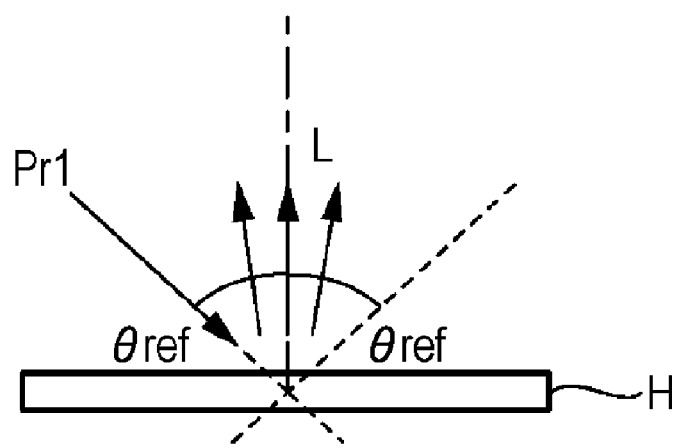
FIGS. 5A and 5B are schematic diagrams used for describing a judgment behavior according to the embodiment of the present invention.
Figure 5B:
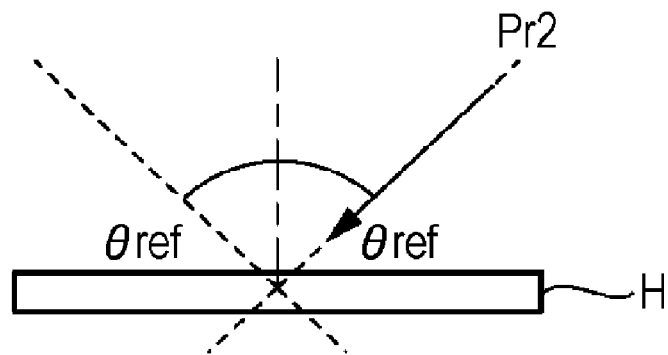

As shown in FIG. 5A, when one reconstruction illumination light Pr1 which meets the reconstruction condition is shone on the genuine Lippmann hologram H, the reconstruction light L is diffracted, whereby a stereoscopic image is reconstructed. However, as shown in FIG. 5B, when the other reconstruction illumination light Pr2 is shone on the Lippmann hologram H, the reconstruction light is not diffracted, and a stereoscopic image is not reconstructed.

Figure 6A:
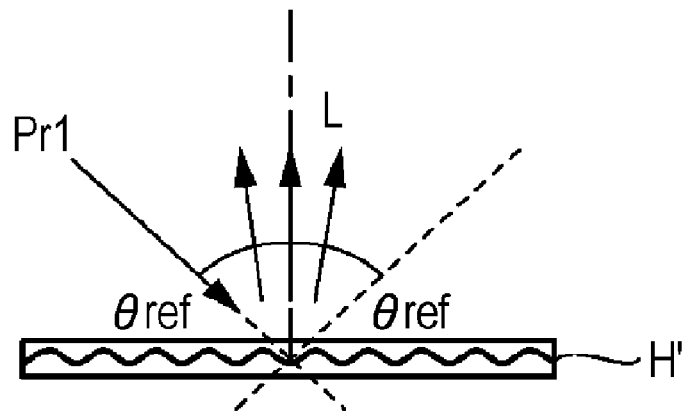
FIGS. 6A and 6B are schematic diagrams used for describing the judgment behavior according to the embodiment of the present invention.
Figure 6B:
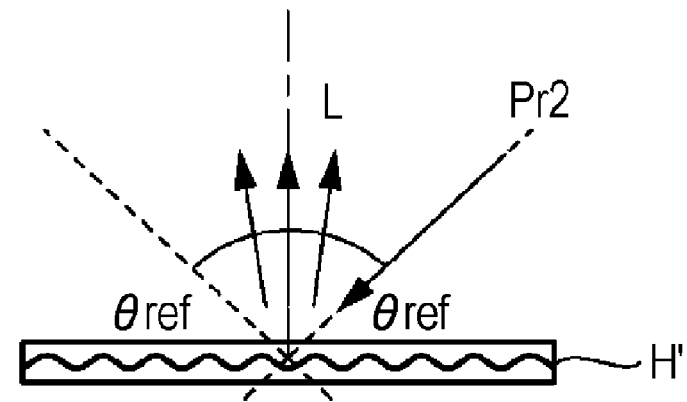

FIGS. 6A and 6B illustrate a case in which the reconstruction illumination light is sequentially shone on the embossed hologram (counterfeit) H'. The reconstruction illumination light Pr1 from the light source 21 is shone on the hologram H' (FIG. 6A), and the reconstruction illumination light Pr2 from the light source 22 is shone on the hologram H' (FIG. 6B). In either of these two cases, the reconstruction light L is diffracted, and a hologram can be reconstructed. As described above, it is possible to make a judgment as to whether a hologram is genuine or not based on whether the reconstruction light is diffracted or not when the reconstruction illumination light Pr2 is shone on the hologram.

2. Another Embodiment

The Diffraction Efficiency of a Lippmann Hologram and an Embossed Hologram with respect to the Wavelength of the Reconstruction Illumination Light The thickness of a hologram has a great influence on the angular selectivity and the wavelength selectivity of the reconstruction illumination light. According to "An Introduction to Holography—Its Principles and Practice—" by Toshihiro Kubota (First Edition, November 1995, Asakura Publishing Co., Ltd.), if the wavelength width from when the intensity of the reconstruction light reaches its peak until the intensity first becomes 0 is Δλ, then the wavelength width Δλ is approximately given by the following expression.

$$\Delta\lambda = d_z \lambda_0 / T = \lambda_0^2 / \{T(n \mp \sqrt{n^2 - \sin^2\theta_r})\} \qquad \text{[Expression 1]}$$

In the above expression, $\lambda_0$ is the reconstruction wavelength determined by the recording wavelength;

T is the thickness of the hologram;

$d_z$ is the spacing between the interference fringes in the z-axis direction;

n is the average index of refraction of the hologram; and

θr is the angle of incidence of the reference light.

A symbol (−) in the above expression corresponds to the transmission hologram, and a symbol (+) corresponds to the Lippmann hologram.

As for an actual hologram, the theoretic wavelength width $\Delta\lambda$ from the wavelength at which the intensity of the reconstruction light reaches its peak until the intensity first becomes 0 and the wavelength width with a full width at half maximum at which the intensity of the reconstruction light of a real hologram becomes half of the peak value have the same order when an order estimate of the difference between these wavelength widths is calculated.

In view of these points, the wavelength width $\Delta\lambda$ in the reflection-type Lippmann hologram takes on a value around 5 to 20 nm. By way of example, it is assumed that $\lambda_0$ is 532 nm, T is 10 μm, n is 1.52, and θr is 135 degrees (=180 degrees -45 degrees). Then the wavelength width $\Delta\lambda$ is 9.88 nm (about 10 nm).

Figure 7:
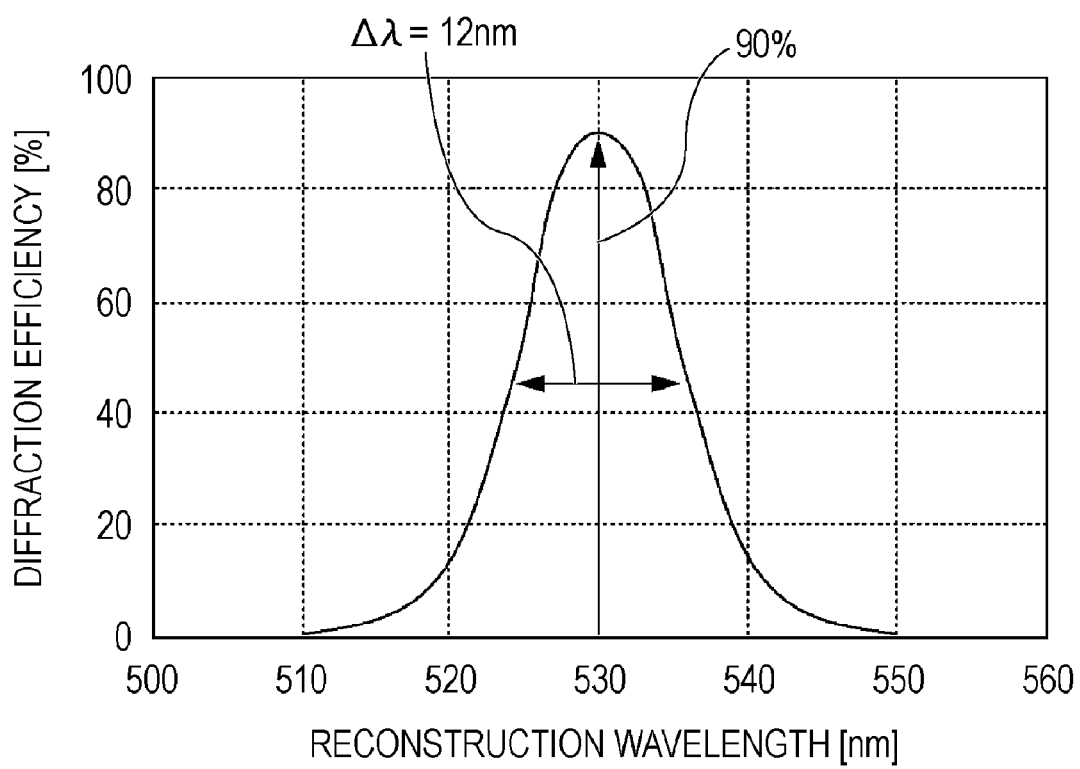
FIG. 7 is a graph showing an example of the diffraction efficiency with respect to the reconstruction wavelength of a Lippmann hologram to which an embodiment of the present invention is applicable.

In an actual Lippmann hologram, as shown in FIG. 7, the wavelength width $\Delta\lambda$ with a full width at half maximum is 12 nm, and the maximum diffraction efficiency of 90% is obtained.

On the other hand, the wavelength width $\Delta\lambda$ in the transmission hologram takes on a value about 150 to 200 nm or more. By way of example, it is assumed that $\lambda_0$ is 532 nm, T is 10 μm, n is 1.52, and Θr is 45 degrees. Then the wavelength width $\Delta\lambda$ is 162.2 nm (about 160 nm).

Furthermore, in a "thin hologram" such as an embossed hologram, the thickness T of a hologram can be considered to take on a smaller value. Therefore, the wavelength width $\Delta\lambda$ takes on a value exceeding 400 to 800 nm.

The fact that the hologram has such a broad wavelength width $\Delta\lambda$ indicates that diffraction occurs across the visible light wavelength range (380 to 780 nm) and the reconstruction light is generated in a direction according to each wavelength with respect to the angle of incidence of the reference light. That is, as for the Lippmann hologram, when the hologram is illuminated with the illumination light with a wavelength slightly deviated from the reconstruction wavelength, the reconstruction light becomes dark or disappears. On the other hand, as for the embossed hologram, diffraction occurs even by the illumination light with a wavelength slightly deviated from the reconstruction wavelength, and, by adjusting the angle of incidence of the illumination light, it is possible to diffract the light in the same direction as the reconstruction light with a reconstruction wavelength.

How to Distinguish a Lippmann Hologram from an Embossed Hologram

In another embodiment of the present invention, a hologram is illuminated by first and second light sources with different wavelengths in order to judge whether a hologram is a counterfeit in the form of an embossed hologram or not. The first light source includes a wavelength component with a wavelength λ which meets the reconstruction condition for a genuine Lippmann hologram. The second light source does not include a wavelength component with a wavelength λ which meets the reconstruction condition for a Lippmann hologram. It is preferable that the first and second light sources be lit alternately or in the order in which the first and second light sources adjoin.

Figure 8A:
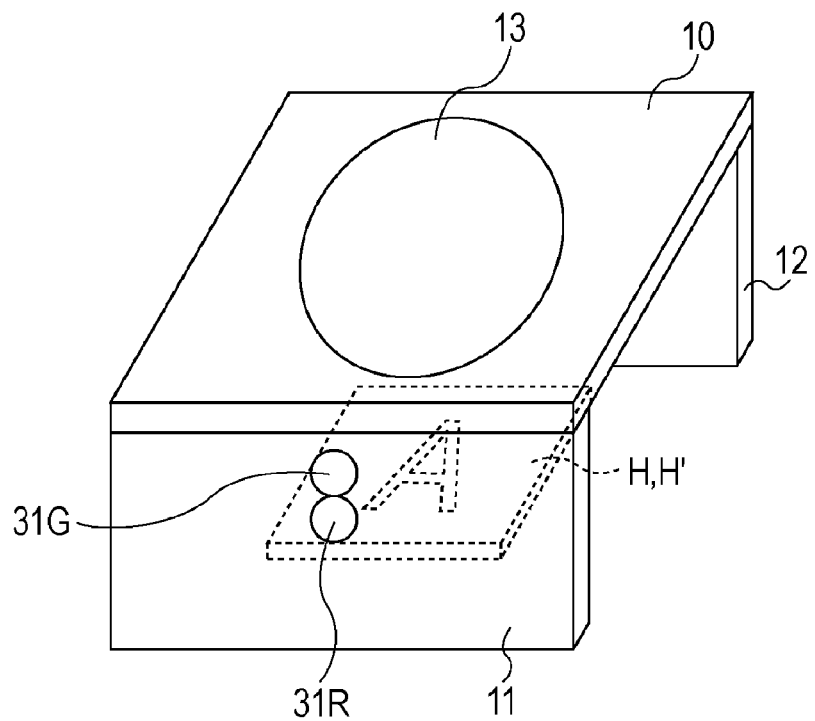
FIGS. 8A and 8B are a perspective view and a sectional view, respectively, of a judging apparatus according to another embodiment of the present invention.
Figure 8B:
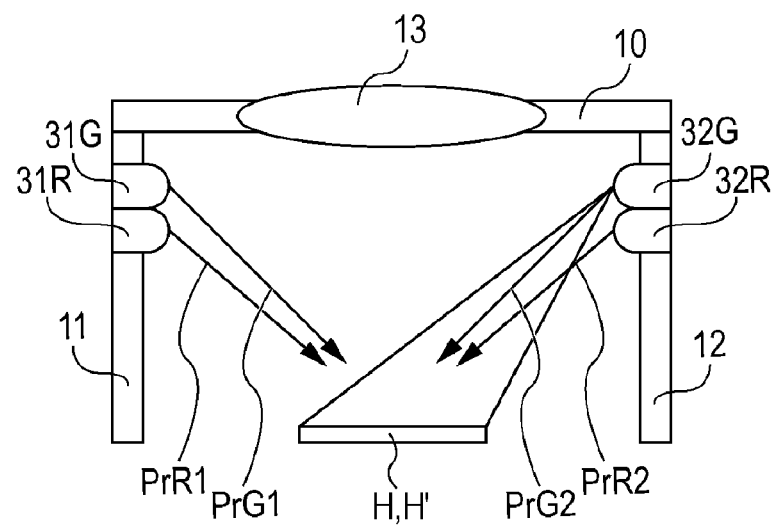

As shown in FIGS. 8A and 8B, a judging apparatus according to the other embodiment of the present invention has a rectangular top surface plate 10 and side surface plates 11 and 12 extending downward perpendicularly from the both sides of the top surface plate 10 and having the same shape. The top surface plate 10 and the side surface plates 11 and 12 are made of a material such as synthetic resin or metal.

A hologram H/H' on which a judgment is to be made is put on the bottom of the space formed by the top surface plate 10 and the side surface plates 11 and 12. The letter "A" is shown in the drawing as a hologram image to be reconstructed. A magnifying lens 13 is attached to the top surface plate 10.

A first light source 31G and a second light source 31R emitting reconstruction illumination light PrG1 and reconstruction illumination light PrR1, respectively, from an inner surface of the side surface plate 11 toward the hologram H/H' are attached so as to be closely situated in almost the same position. The angles of incidence of the light from the light sources 31G and 31R with respect to the hologram H/H' meet the reconstruction condition of a Lippmann hologram for the angle.

The light source 31G includes a wavelength component (for example, λ=525 nm) with a wavelength λ (for example, λ=535 nm) which meets the reconstruction condition for a Lippmann hologram. By way of example, a green LED is used. The light source 31R does not include a wavelength component with a wavelength λ which meets the reconstruction condition for a Lippmann hologram. By way of example, a red LED (for example, λ=660 nm) is used.

In the example shown in FIGS. 8A and 8B, as is the case with the embodiment described earlier, a light source 32G and a light source 32R emitting reconstruction illumination light PrG2 and reconstruction illumination light PrR2, respectively, from an inner surface of the side surface plate 12 toward the hologram H/H' are attached so as to be closely situated in almost the same position. As the light source 32G, a green LED is used, and, as the light source 32R, a red LED is used. The angles of incidence of the light from the light sources 32G and 32R with respect to the hologram H/H' do not meet the reconstruction condition of a Lippmann hologram for the angle. However, as described in the embodiment described earlier, it is possible to dispose the light source 32G, for example, so as to meet the reconstruction condition of an embossed hologram for the angle by making the light from the light source 32G enter the hologram at an angle of incidence θref which is identical to the angle of incidence of the reconstruction illumination light PrG1 with reference to the normal direction of the hologram.

Figure 9A:
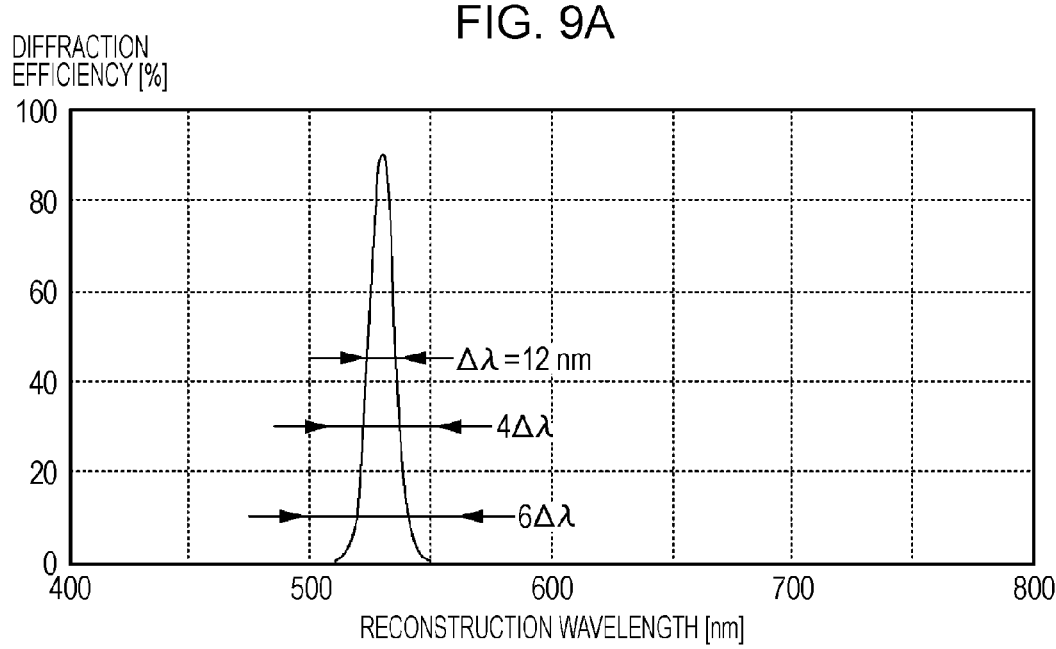
FIGS. 9A and 9B are a graph showing an example of the diffraction efficiency with respect to the reconstruction wavelength of a Lippmann hologram to which an embodiment of the present invention is applicable and a graph showing the emission spectrum of a light source, respectively.

As is the case with FIG. 7 described earlier, FIG. 9A shows the diffraction efficiency of an actual Lippmann hologram. In the Lippmann hologram, the wavelength width $\Delta\lambda$ with a full width at half maximum is 12 nm, and the maximum diffraction efficiency of 90% is obtained. FIG. 9A also shows a wavelength width $4\Delta\lambda$ which is four times greater than the wavelength width $\Delta\lambda$ with a full width at half maximum and a wavelength width $6\Delta\lambda$ which is six times greater than the wavelength width $\Delta\lambda$ with a full width at half maximum.

Figure 9B:
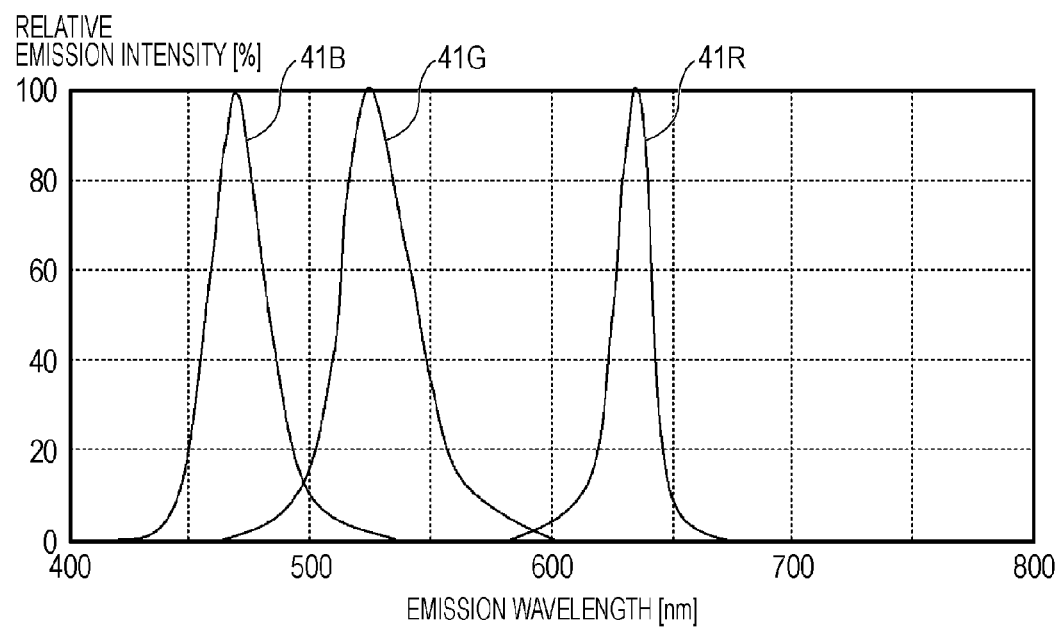

An example of the emission spectra of LED light sources used as the light sources 31G to 32R is shown in FIG. 9B. An emission spectrum 41B of a blue LED has a peak wavelength of 470 nm, an emission spectrum 41G of a green LED has a peak wavelength of 525 nm, and an emission spectrum 41R of a red LED has a peak wavelength of 630 nm. Though not shown in the drawing, standard light D65 or D50 has a broad and gentle emission spectrum in the 380- to 780-nm range which is the wavelength range of visible light, and an emission spectrum of a fluorescent lamp (F2, F7) or a white LED mixing the light obtained by exciting phosphors has several emission wavelength peaks in the 400- to 750-nm range.

As is clear from FIGS. 9A and 9B, a region near the wavelength at which the diffraction efficiency of the Lippmann hologram becomes maximum and the emission spectrum 41G of the green LED overlap. On the other hand, the emission spectrum 41R of the red LED and a region near the wavelength at which the diffraction efficiency of the Lippmann hologram becomes maximum do no overlap. The emission spectrum 41B of the blue LED and a region near the wavelength at which the diffraction efficiency of the Lippmann hologram becomes maximum partly overlap. However, the relative emission intensity in the emission spectrum 41B is low in a region near the wavelength at which the diffraction efficiency becomes maximum.

The result of the experiment using an actual hologram and an LED light source is shown in FIG. 10. As for the illumination condition, the angle of incidence of the illumination light is adjusted under each condition so that the reconstruction light appears as bright as possible when a hologram is observed from the front. In the case of a Lippmann hologram, the hologram is invisible when the red LED is used, the hologram appears bright when the green LED is used, and the hologram appears dark when the blue LED is used. In the case of an embossed hologram, the hologram is visible when any of the red LED, the green LED, and the blue LED is used.

Incidentally, in the example described above, the green LED is used. However, recording may be performed on the hologram by setting a peak wavelength of the spectrum of the diffraction efficiency, which is the reconstruction condition, to blue by setting the wavelength of the recording reference light to blue, and the blue LED may be used as the reconstruction illumination light which meets the reconstruction condition. In this case, the spectral distribution of the diffraction efficiency and the emission spectrum 41R of the red LED have separate distributions with respect to a wavelength, making it possible to make it clear whether the reconstruction light is "visible" or "invisible".

As described above, it is possible to judge whether a hologram is a counterfeit produced by the embossing method or not based on whether or not the emission spectrum of a light source used at the time of reconstruction is included in the wavelength width from the wavelength of the reconstruction illumination light of a Lippmann hologram, the wavelength at which the diffraction efficiency becomes maximum, to the wavelength at which the diffraction efficiency becomes almost 0. Furthermore, based on the diffraction theory of a hologram and the result of the experiment, the wavelength width $4\Delta\lambda$ which is four times greater than the wavelength width $\Delta\lambda$ (with a full width at half maximum) or a wavelength width $6\Delta\lambda$ which is six times greater than the wavelength width $\Delta\lambda$ (with a full width at half maximum) in the diffraction efficiency of a genuine Lippmann hologram can be regarded as the wavelength width to the wavelength at which the diffraction efficiency becomes almost 0.

In the embodiment of the present invention, it is preferable to use a light source emitting reconstruction illumination light and having a relative emission intensity of 100 or 50 or less, more preferably, 10 or less, in the above wavelength width ($4\Delta\lambda$ or $6\Delta\lambda$). As a result of such a light source being used, a Lippmann hologram appears adequately dark, and, if a hologram is an embossed hologram, the hologram appears bright. This makes it possible to judge whether a hologram is a genuine Lippmann hologram or a counterfeit with ease and precision.

In addition, the use of the light source (green) 32G and the light source (red) 32R makes it possible to make a judgment with more precision. That is, as shown in FIG. 11, in the case of a Lippmann hologram (a genuine Lippmann hologram), the hologram is invisible by the light source 32G because the reconstruction condition for the angle is not met, and the hologram is invisible by the light source 32R because the reconstruction condition for the wavelength is not met. By contrast, in the case of an embossed hologram (a counterfeit), the hologram is visible when any of the light sources 32R and 32G is used. That is, in the case of an embossed hologram, there is a state in which both the reconstruction condition of the diffraction theory for the angle and the reconstruction condition of the diffraction theory for the wavelength are met. In this way, the four light sources 31G, 31R, 32G, and 32R are sequentially made to emit light, and the results regarding whether the hologram is visible or not are obtained. Based on the results thus obtained, it is possible to judge whether the hologram is genuine or not.

Incidentally, in this embodiment, the light source 31R is attached so as to be situated in almost the same position as the light source 31G; however, this position may be appropriately adjusted for the following reason. As described above, in the embossed hologram, diffraction occurs even by the reconstruction illumination light with a wavelength deviated from the reconstruction wavelength (a region near the wavelength at which the diffraction efficiency becomes maximum) of the Lippmann hologram; however, it is preferable to adjust the angle of incidence of the reconstruction illumination light in order to diffract the light in the same direction (for example, to the front of the hologram) as the reconstruction light with a reconstruction wavelength.

For example, suppose the angle of incidence of the reconstruction illumination light when the reconstruction wavelength of a Lippmann hologram is green is $\theta$ref. In this case, when an embossed hologram is illuminated with red reconstruction illumination light, the angle of incidence is adjusted to a position in which the angle of incidence is $\theta$ which is greater than $\theta$ref, i.e., $\theta > \theta$ref. This adjustment is suitable for red with a long wavelength compared to green to diffract light to the front of the hologram.

Moreover, although the light source 32R is attached in almost the same position as the light source 32G as is the case with the light sources 31R and 31G, it is preferable to attach the light source 32R in a position in which the angle of incidence $\theta$ of the light source 32G, which is red reconstruction illumination light, is greater than $\theta$ref.

Figure 12A:
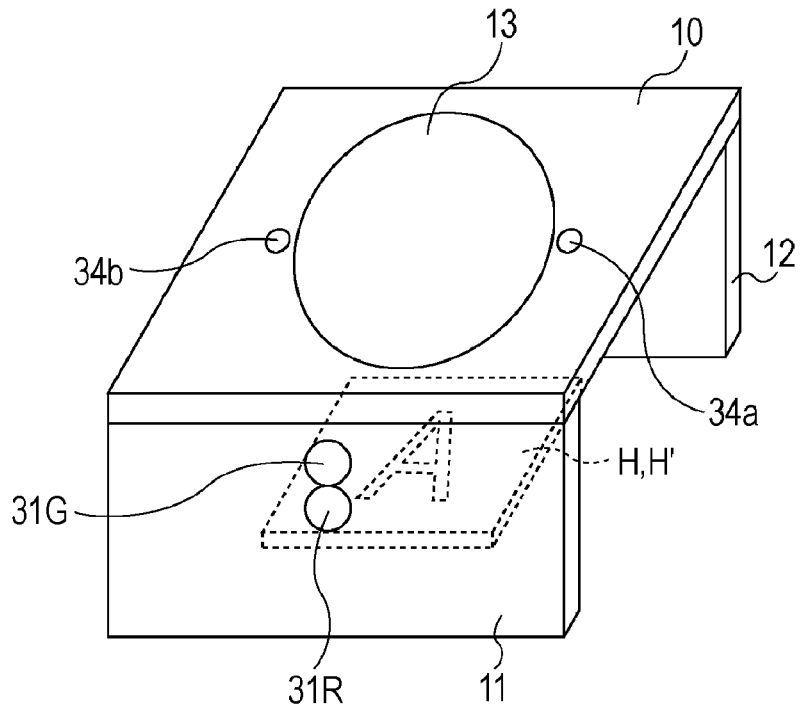
FIGS. 12A and 12B are a perspective view and a sectional view, respectively, illustrating the structure of the judging apparatus according to the other embodiment of the present invention, the judging apparatus to which a light receiving section is added.
Figure 12B:
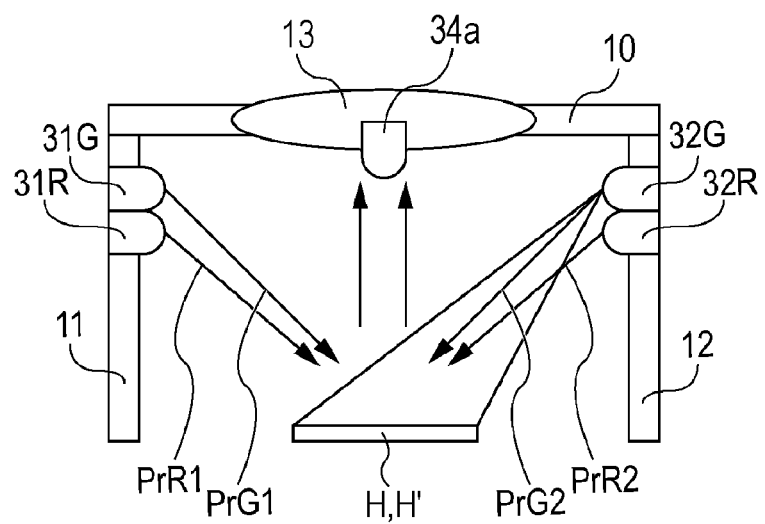

As shown in FIGS. 12A and 12B, in a modified example of the other embodiment of the present invention, light receiving elements (photodetectors) 34a and 34b receiving diffracted light (reconstruction light) from a hologram are attached to the top surface plate 10. The light receiving elements 34a and 34b convert the light of a reconstructed image of the hologram into an electrical signal, and supplies the electrical signal to an unillustrated judgment circuit. The judgment circuit performs measurement and comparison of the amount of light received by the light receiving elements 34a and 34b at the time of switching of the light sources. The judgment circuit judges whether the hologram is genuine or not based on the amount of diffracted light (reconstruction light). The user is notified of the judgment result of the judgment circuit, the judgment result regarding the probability that a hologram on which a measurement has been performed is a Lippmann hologram, by voice, displayed images/characters, or a lit lamp.

The use of the output signal of the light receiving element allows the user who has little knowledge of holograms to learn about the judgment result by voice, displayed images/characters, or a lit lamp, instead of a visual check. In other words, the judgment standard is not affected by the amount of knowledge the user has, making it possible to enhance the reproducibility of the judgment. Incidentally, the wavelength and the incident direction of the reconstruction light with which the hologram is illuminated may be switched independently in accordance with an instruction signal from the judgment circuit.

When measurement of the amount of light received by the light receiving elements 34a and 34b is performed, the voltage output or the current output from the light receiving elements 34a and 34b may be simply measured. However, there may be an influence of outside light such as ambient light on the light sources 31G to 32R. In such a case, modulation which is performed too fast to be recognized by human eyes is performed on the light emitted from the light sources 31G to 32R, and the hologram is illuminated with the resultant light. Then, by detecting signals indicating the amount of light, the signals from the light receiving elements 34a and 34b, with a lock-in amplifier which uses a modulation signal of the light source as a reference signal, it is also possible to reduce the influence of noise caused by the outside light or the like.

3. Light Source Driving Method

Figure 13A:
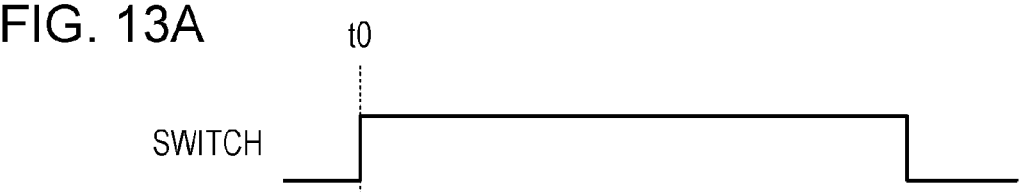
FIGS. 13A to 13D are timing charts of a first example of a light source driving method according to an embodiment of the present invention.
Figure 13B:
Figure 13C:
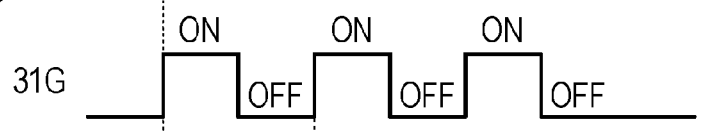
Figure 13D:
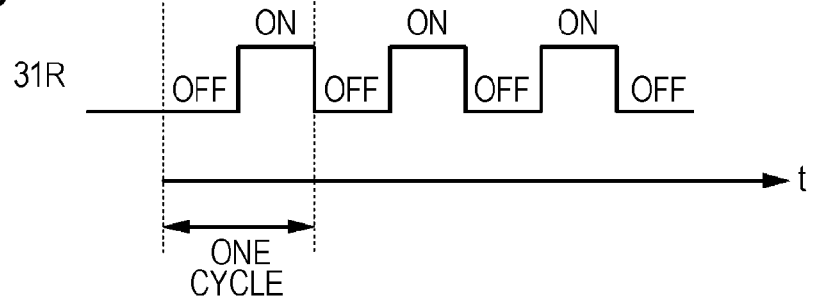

Examples of a method for driving the light sources 31G to 32R will be described. FIGS. 13A to 13D are timing charts of a first example of the driving method. In FIGS. 13A to 13D, a switch is operated at time t0. As the switch, a toggle switch, as shown in FIG. 13A, or a trigger switch, as shown in FIG. 13B, may be used. When the switch is pressed, the light source 31G is turned on (which means that is goes on) for a predetermined time, for example, for one second. The moment when the light source 31G is turned off (which means that it goes off), the light source 31R is turned on. A period in which the light sources 31G and 31R are turned on in turn corresponds to one cycle. When three cycles of operation are performed, the light sources 31G and 31R remain off.

In the first example, first, both a Lippmann hologram and an embossed hologram shine while the light source (green LED) 31G is first lit, making it possible to recognize the position of the hologram in a dark environment. Next, if the hologram reconstructed image which has been visible disappears the instant at which the light source (red LED) 31R is lit, the hologram can be judged to be a "Lippmann hologram (genuine Lippmann hologram)"; if the hologram reconstructed image remains visible, the difference is clear, and the hologram can be judged to be an "embossed hologram (counterfeit)".

The above-described process can be rechecked by performing the process twice or more, rather than once. At this time, the time set as one cycle is important. In the example described above, two seconds are set as one cycle. If one cycle is too short, human eyes and cerebral nerves are unable to keep up with the cycle and respond. If one cycle is too long, it takes too long to perform a process for judging a hologram is genuine or not, making the method unpractical. By way of example, it is preferable that the visual stimulus response mean time be assumed to be about 200 ms, and the time equal to or longer than the above mean time be set as one cycle. That is, it is preferable that one cycle be set to 0.2 to 10 seconds. Each light source is lit for 0.1 to 5 seconds.

As shown in the timing charts in FIGS. 13A to 13D, the first example of the light source driving method described above can also be applied to the light sources (green LEDs) 21 and 22 in the embodiment described earlier. As shown in FIG. 14A or 14B, after the switch is pressed, the light source 21 is driven as shown in FIG. 14C, and the light source 22 is driven as shown in FIG. 14D. Also in this case, in consideration of the human visual response time and in order to make a judgment speedily, one cycle is set to 0.2 to 10 seconds. Each LED is lit for 0.1 to 5 seconds.

When the output signals of the light receiving elements 34a and 34b are used for a judgment as shown in FIGS. 12A and 12B, one cycle can be shortened.

In addition, the arrangement of the light sources is not limited to the arrangement in which two light sources are symmetrically disposed. It is also possible to dispose three light sources 35B, 35R, and 35G (of three primary colors) on one side, and dispose one green light source 36G on the opposite side. A second example of a method for driving the light sources disposed in the manner as described above will be described with reference to the timing charts of FIGS. 15A to 15E.

Figure 15A:
FIGS. 15A to 15E are timing charts of a second example of a light source driving method according to an embodiment of the present invention.
Figure 15B:
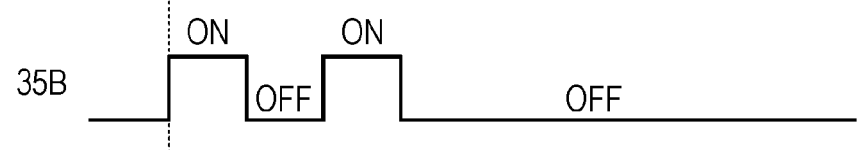
Figure 15C:
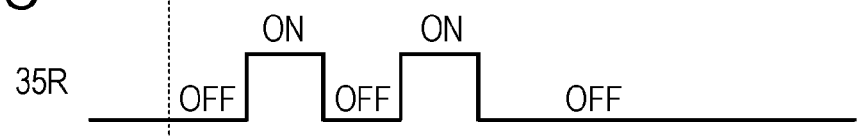
Figure 15D:
Figure 15E:
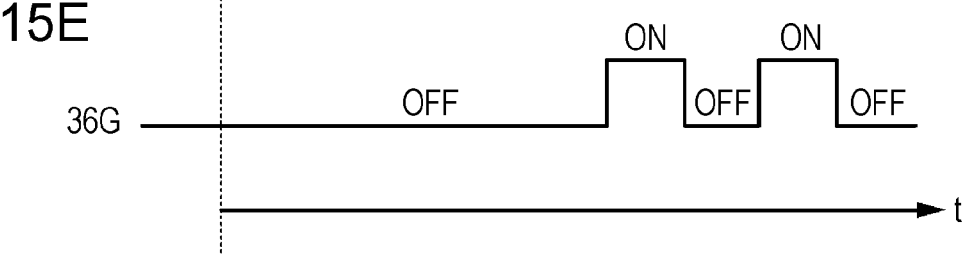

As shown in FIG. 15A, when the switch is pressed at time t0, the light source 35B (FIG. 15B) and the light source 35R (FIG. 15C) are alternately turned on. When two cycles of on/off operations are performed, the light sources 35B and 35R are switched off. Next, the light sources 35G and 36G are alternately turned on. When two cycles of operations are performed, the light sources 35G and 36G are turned off.

In the second example, when the blue light source 35B and the red light source 35R are alternately turned on, a Lippmann hologram (genuine Lippmann hologram) flickers. Next, when the green light source 35G and the green light source 36G are alternately turned on, the Lippmann hologram flickers. If the hologram is an embossed hologram (counterfeit), even when the light sources are turned on/off, the hologram does not flicker and remains visible. Based on the difference described above, it is possible to judge whether the hologram is genuine or not.

Method of Supporting Judgment

As described above, a judgment as to whether a hologram is an embossed hologram or a Lippmann hologram is made based on whether the hologram reconstructed image is visible or invisible simultaneously with the switching of the light sources. Thus, it is sometimes difficult for a person who makes a judgment to grasp judgment timing intuitively.

Figure 16A:
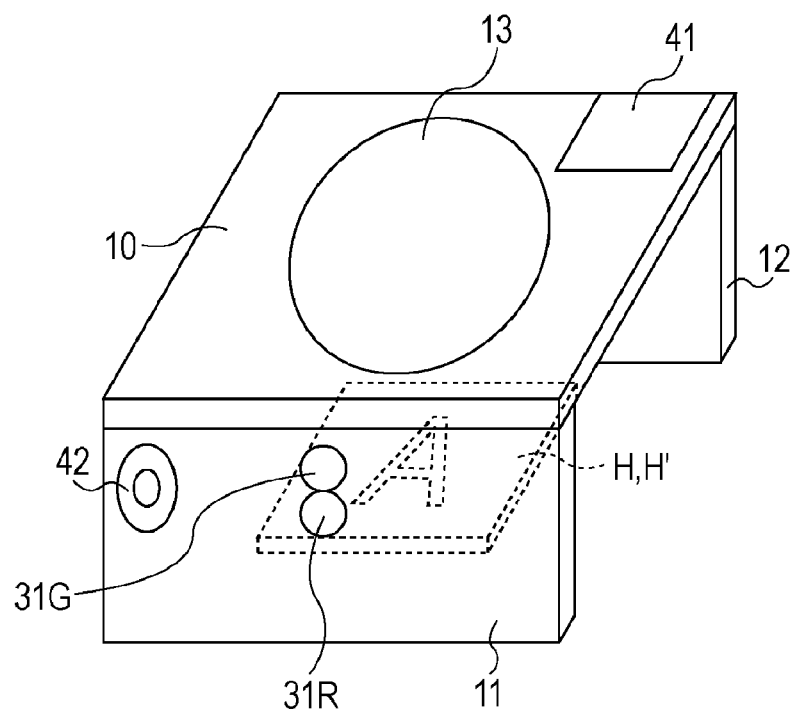
FIGS. 16A and 16B are a perspective view and a sectional view, respectively, of a structure with consideration given to a method of supporting a judgment of the judging apparatus according to an embodiment of the present invention.
Figure 16B:
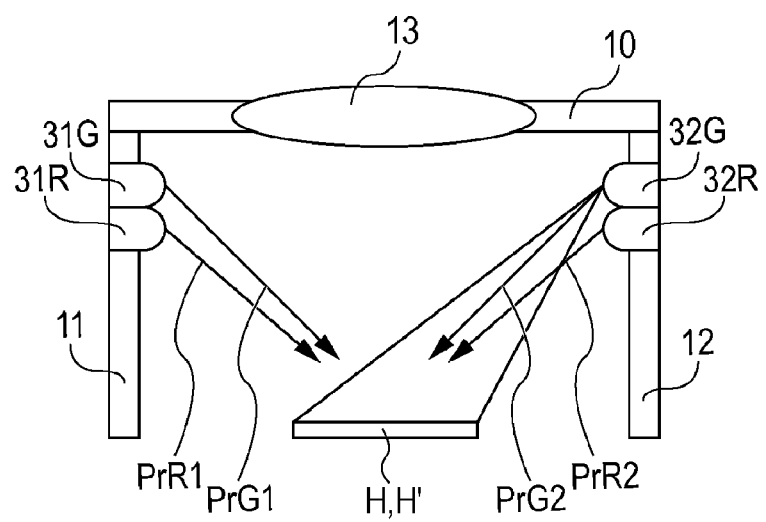
Figure 17A:
FIGS. 17A to 17F are timing charts used for describing the behavior of the structure shown in FIGS. 16A and 16B.
Figure 17B:
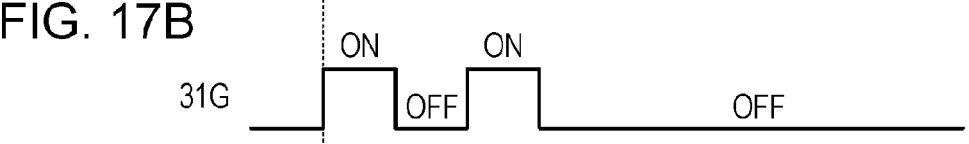
Figure 17C:
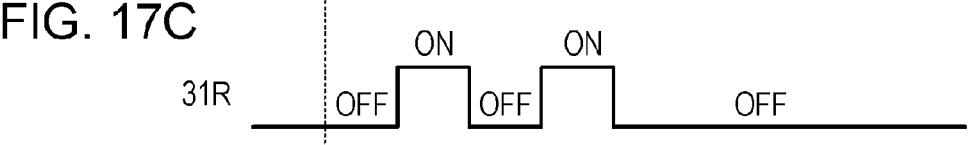
Figure 17D:
Figure 17E:

To solve this problem, as shown in FIGS. 16A and 16B, any one of a display unit 41 such as a liquid crystal display device and a speaker 42 or both is added to the judging apparatus (for example, the structure shown in FIGS. 8A and 8B). As shown in FIG. 17A, the switch is turned on at time t0. First, as shown in FIGS. 17B and 17C, the light sources 31G and 31R are alternately driven, and a Lippmann hologram flickers in synchronism with the operation of the light sources. After a lapse of a period of two cycles, the light sources 31G and 31R are turned off, and, as shown in FIGS. 17D and 17E, the light sources 32G and 32R are alternately driven. In this period, the hologram reconstructed image of a Lippmann hologram is invisible. By contrast, if the hologram is an embossed hologram, the hologram reconstructed image is visible at all times.

Figure 17F:
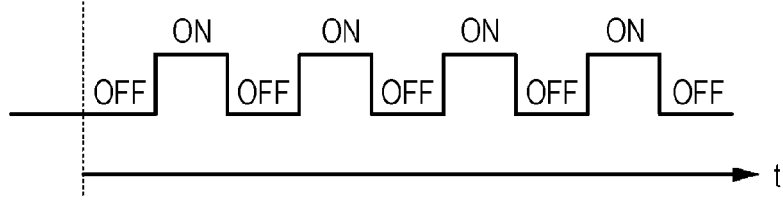

Any one of the display unit 41 and the speaker 42 or both is driven in the on period shown in FIG. 17F. When the speaker 42 is driven, a message saying "IF YOU SEE IMAGE NOW, HOLOGRAM IS NOT LIPPMANN HOLOGRAM" is produced. Alternatively, a message saying "IF YOU SEE IMAGE NOW, HOLOGRAM IS COUNTERFEIT" is produced to more directly identify the hologram that is produced to resemble a Lippmann hologram. Notification does not necessarily have to be given by voice; clear mechanical sound may be produced instead. Furthermore, in place of sound or voice, or in addition to sound or voice, the characters etc. indicating the same message are displayed on the display unit 41 with on timing. A person who makes a judgment can make a proper judgment based on the voice produced by the speaker 42 or the message displayed on the display unit 41.

Figure 18:
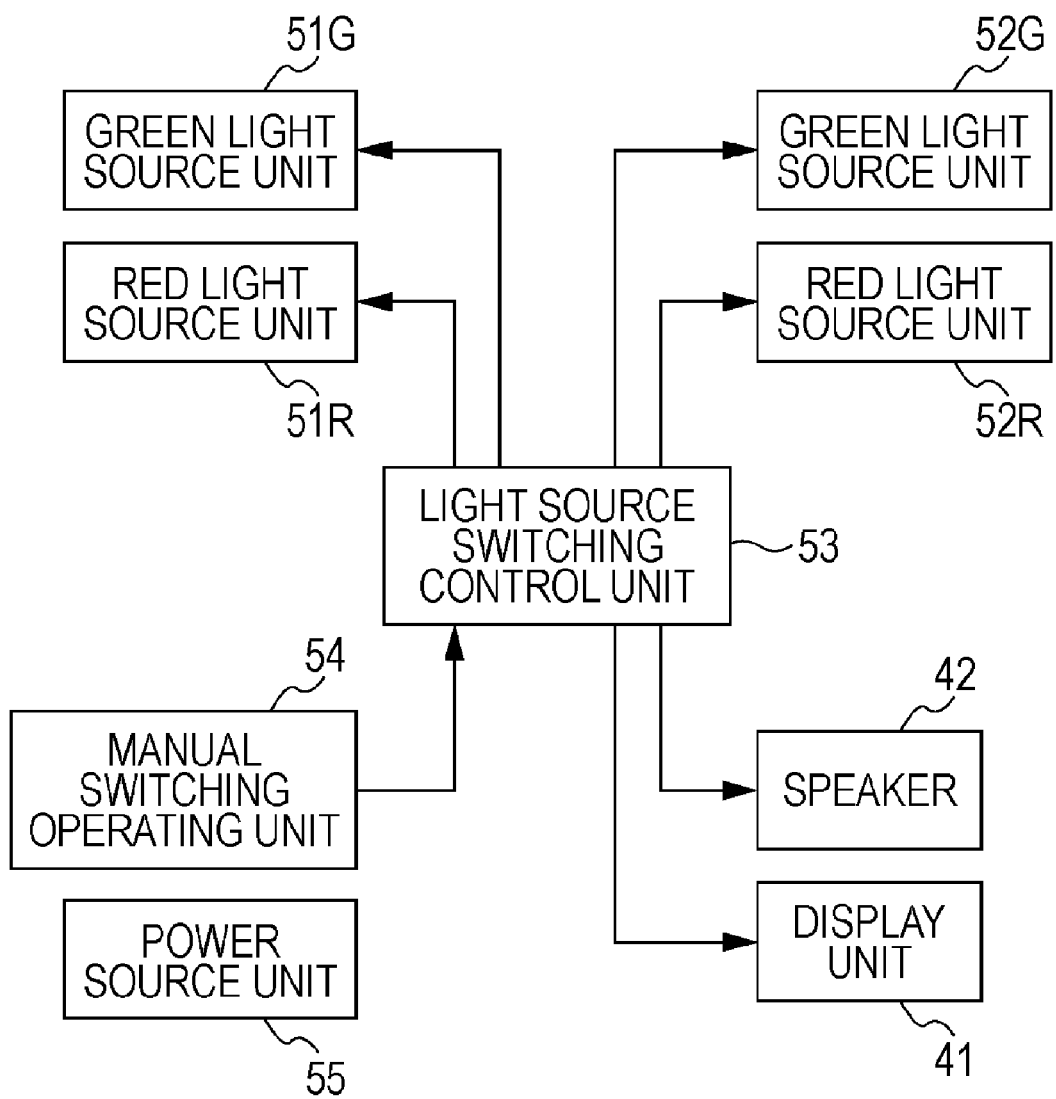
FIG. 18 is a block diagram illustrating the electrical configuration of the structure shown in FIGS. 16A and 16B.

The electrical configuration of the judging apparatus shown in FIGS. 16A and 16B can be described by a block diagram of FIG. 18. A green light source unit 51G including the green light source 31G emitting the reconstruction illumination light which matches the reconstruction condition of a Lippmann hologram is provided. A red light source unit 51R including the red light source 31R, a green light source unit 52G including the green light source 32G, and a red light source unit 52R including the red light source 32R are provided. On/off control of these light source units is performed by a light source switching control unit 53.

To the light source switching control unit 53, an output signal of a manual switching operating unit 54 is supplied. In accordance with an instruction from the user, the manual switching operating unit 54 allows automatic emission switching of the light sources to be temporarily stopped, the time interval of automatic emission switching of the light sources to be changed, and the flash of the light sources to be manually switched. Furthermore, a power source unit 55 supplying power to all parts of the apparatus is provided. In addition to turning on/off a main power source, the power source unit 55 supplies power from a battery or an external power source. The light source switching control unit 53 controls on/off of the display unit 41 and the speaker 42. Incidentally, in addition to being notified of timing by voice, displayed images/characters, or a lit lamp, the user may be notified of timing by vibration produced by a vibrating motor or the like.

An Example of a Switch

Figure 19A:
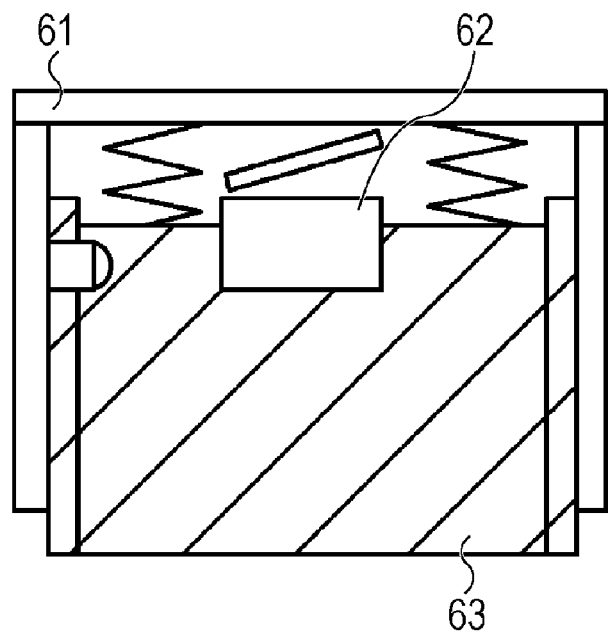
FIGS. 19A and 19B are schematic diagrams illustrating an example of a switch used in the judging apparatus according to an embodiment of the present invention.
Figure 19B:
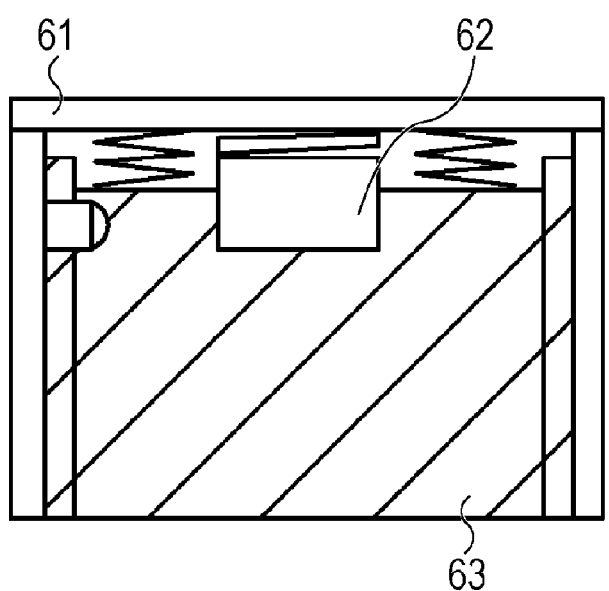

In an embodiment of the present invention, a switch having a structure shown in FIGS. 19A and 19B can be used. A housing 61 is slidably fitted onto a supporting unit 63, and a mechanical switch (for example, a microswitch) 62 is attached to the supporting unit 63. The housing 61 is made up of the top surface plate and a pair of side surface plates of the judging apparatus. The supporting unit 63 has a space in the center thereof to put a hologram. A hologram on which a judgment is to be made is put on the bottom of the space. As shown in FIG. 19A, when the housing 61 is not pressed from above, the switch 62 is in an off state.

The end of the supporting unit 63 is pressed against, for example, the hologram on which a judgment is to be made or the plate surface on which the hologram is placed, and the housing 61 is pressed from above against the spring force of a spring. Then, as shown in FIG. 19B, the switch 62 is brought into an on state. As a result of the switch being turned on, a process for judging whether a hologram is genuine or not is started in the manner as described above. Since adjustment has been made so that the magnifying lens focuses on the hologram on which a judgment is to be made in a state in which the end of the supporting unit 63 is pressed against, for example, the hologram on which a judgment is to be made or the plate surface on which the hologram is placed, pressing the switch corresponds to the act of making a judgment as to whether the hologram is genuine or not. A special operation for pressing the switch is not necessary. The use of such a switch reduces electric power consumption because the switch is in an off state except when a judgment is made.

The structure with the built-in mechanical microswitch 62 has been described above; however, the structure is not limited thereto. Various sensors such as various kinds of optical sensors including a transmission optical sensor and a reflective optical sensor, a vibration sensor which operates in response to a touch, and a sound sensor may be used as long as these sensors function in the same way as the mechanical microswitch 62.

4. Modified Example

Although specific embodiments of the present invention have been described, the present invention is not limited to these embodiments, and many modifications and variations of the present invention are possible. For example, in addition to an LED, a laser can be used as the light source. Furthermore, a plurality of light sources may be formed by switching color filters for one white light source.

The present application contains subject matter related to that disclosed in Japanese Priority Patent Application JP 2009-117450 filed in the Japan Patent Office on May 14, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A hologram judging apparatus comprising:
a housing; and
first and second light sources attached to the housing and that emit reconstruction illumination light into an interior of the housing,
wherein,
the housing is such that only reconstruction illumination lights from the first and second light sources are effective to permit evaluation of a purported Lipmann hologram within the housing,
each of the reconstruction illumination lights from the first and second light sources includes a wavelength component with a wavelength $\lambda$ meeting a reconstruction condition of an authentic Lippmann hologram,
the reconstruction illumination light of any one of the first and second light sources enters the hologram at an angle $\theta$ref which is identical to another angle $\theta$ref with respect to a normal in a plane of incidence, the another angle $\theta$ref meeting a reconstruction condition of a Lippmann method,
the genuineness of the purported Lippmann hologram can be determined based on the visibility and appearance of any reconstruction of the Lippmann hologram within the housing using the reconstruction illumination lights from the first and second light sources.

2. The hologram judging apparatus according to claim 1, wherein wavelengths of the reconstruction illumination lights from the first and second light sources are included in a wavelength width from a wavelength of reconstruction illumination light of the Lippmann hologram, the wavelength at which diffraction efficiency becomes maximum, to a wavelength at which the diffraction efficiency becomes almost 0.

3. A hologram judging apparatus comprising:
a housing; and
first and second light sources attached to the housing and that emit reconstruction illumination light into an interior of the housing so as to illuminate a hologram on which a judgment as to whether it is a Lippmann hologram is to be made,
wherein,
the housing is such that only reconstruction illumination lights from the first and second light sources are effective to permit evaluation of the hologram within the housing,
the reconstruction illumination light of one of the first and second light sources includes a wavelength component with a wavelength $\lambda$ meeting a reconstruction condition of the Lippmann hologram,
whether the hologram is a Lippmann hologram can be determined based on the visibility and appearance of any reconstruction of the hologram within the housing using the reconstruction illumination lights from the first and second light sources.

4. The hologram judging apparatus according to claim 3, wherein a wavelength of the reconstruction illumination light of one of the first and second light sources is included in a wavelength width from a wavelength of reconstruction illumination light of the Lippmann hologram, the wavelength at which diffraction efficiency becomes maximum, to a wavelength at which the diffraction efficiency becomes almost 0.

5. The hologram judging apparatus according to claim 1 or 3, wherein the first and second light sources are activated by a light source drive unit either alternately or in an order in which the first and second light sources adjoin.

6. The hologram judging apparatus according to claim 5, wherein, when a switch is operated, driving of the first and second light sources is started.

7. The hologram judging apparatus according to claim 5, wherein the apparatus produces an audio signal, a video signal, or both in synchronism with driving of the first and second light sources.

8. The hologram judging apparatus according to claim 1 or 3, further comprising a light receiving element receiving light reflected from the hologram illuminated with the reconstruction illumination light from the first and second light sources, an output of the light receiving element enabling a judgment as to whether the hologram is the Lippmann hologram.

* * * * *

UNITED STATES PATENT AND TRADEMARK OFFICE
CERTIFICATE OF CORRECTION

PATENT NO. : 8,379,281 B2
APPLICATION NO. : 12/765558
DATED : February 19, 2013
INVENTOR(S) : Akira Shirakura and Koji Azhizaki Page 1 of 1

It is certified that error appears in the above-identified patent and that said Letters Patent is hereby corrected as shown below:

On the Title page

Item (75) Inventors:

"Koji Ashikazi"

should be

--Koji Azhizaki--

Signed and Sealed this
Twenty-eighth Day of May, 2013

Teresa Stanek Rea
*Acting Director of the United States Patent and Trademark Office*